US008496751B2

(12) United States Patent
Vlasopoulos et al.

(10) Patent No.: US 8,496,751 B2
(45) Date of Patent: Jul. 30, 2013

(54) BINDER COMPOSITION
(75) Inventors: Nikolaos Vlasopoulos, London (GB); Christopher Robert Cheeseman, London (GB)
(73) Assignee: Calix Ltd, New South Wales (AU)
( * ) Notice: Subject to any disclaimer, the term of this patent is extended or adjusted under 35 U.S.C. 154(b) by 108 days.
(21) Appl. No.: 12/736,928
(22) PCT Filed: Jun. 26, 2009
(86) PCT No.: PCT/GB2009/001610
§ 371 (c)(1),
(2), (4) Date: Jun. 14, 2011
(87) PCT Pub. No.: WO2009/156740
PCT Pub. Date: Dec. 30, 2009
(65) Prior Publication Data
US 2011/0290155 A1 Dec. 1, 2011
(30) Foreign Application Priority Data
Jun. 26, 2008 (EP) .................................... 08252192
(51) Int. Cl.
*C04B 9/00* (2006.01)
(52) U.S. Cl.
USPC .......................................................... 106/801
(58) Field of Classification Search
USPC .......................................................... 106/801
See application file for complete search history.

(56) References Cited

U.S. PATENT DOCUMENTS

| 1,561,473 | A | 11/1925 | Lukens |
| 1,619,534 | A | 3/1927 | Olson |
| 1,819,893 | A | 8/1931 | Greider |
| 1,864,063 | A | 6/1932 | Greider |
| 1,867,180 | A | 7/1932 | Adolf |
| 1,971,909 | A | 8/1934 | Greider |
| 2,209,754 | A | 7/1940 | Abrahams |
| 2,275,032 | A | 3/1942 | Greider et al. |
| 2,396,246 | A | 2/1943 | Callis |
| 2,409,297 | A | 10/1946 | McGarvey |

(Continued)

FOREIGN PATENT DOCUMENTS

| AU | 55715/73 | 5/1973 |
| EP | 0 393 813 A | 10/1990 |

(Continued)

OTHER PUBLICATIONS

Das and Fan; "On the morphological development of solidification structures under forced fluid flow"; *Proc. Inter. Conf. on Advances in Materials and Materials Processing*, Kharagpur, India, Feb. 1-3, 2002 (3 pgs).
Hillert and Hillert; "Rosette-like precipitates of silica"; *Journal of Materials Science*, vol. 5, No. 7; pp. 610-612 (1970) (First page only).
European Patent Office, EP Application No. 09769581.1-2111/2297062, dated Sep. 12, 2011, Third Party Observations (22 pgs).
Annex 2—Part 1, Magnesium carbonate, Magnesium carbonate—Wikipedia, the free encyclopedia, http://en.wikipedia.org/wiki/Magnesium_carbonate, (4 pgs) Dec. 8, 2011.
Annex 2—Part 2, Magnesium carbonate, Magnesium carbonate—Wikipedia, the free encyclopedia, http://en.wikipedia.org/wiki/Magnesium_carbonate, (3 pgs) Aug. 15, 2011.

(Continued)

*Primary Examiner* — Paul Marcantoni
(74) *Attorney, Agent, or Firm* — Nixon & Vanderhye (57) ABSTRACT

This invention relates to a cement binder composition and to the use of the binder composition in construction products. The cement binder composition is based on MgO that absorbs $CO_2$ when hardening. The binder composition of the present invention also comprises at least one magnesium carbonate (either hydrated or unhydrated) having the formula $xMgCO_3\text{-}yMg(OH)_2\text{-}zH_2O$, wherein x is at least 1, and at least one of y or z is greater than 0. The binder composition may optionally comprise a hydroscopic material, for example NaCl. The MgO when mixed with water in the presence of the magnesium carbonate produces magnesium hydroxide that has a rosette-like morphology (as shown).

17 Claims, 2 Drawing Sheets shows the x-ray diffraction spectra of hydrated (a) 100% MgO, (b) 80% MgO - 20% $MgCO_3$ and (c) 80% MgO - 20% hydromagnesite samples.

U.S. PATENT DOCUMENTS

| | | | |
|---|---|---|---|
| 2,502,418 | A | 4/1950 | Callis |
| 2,987,407 | A | 6/1961 | Ulfstedt |
| 3,532,464 | A | 10/1970 | Friemel et al. |
| 4,210,626 | A | 7/1980 | Berrie et al. |
| 4,401,471 | A | 8/1983 | Eckardt et al. |
| 4,664,915 | A | 5/1987 | Simonian |
| 4,838,941 | A | 6/1989 | Hill |
| 4,944,928 | A | 7/1990 | Grill et al. |
| 5,120,478 | A | 6/1992 | Castonguay |
| 5,228,463 | A | 7/1993 | Fournier et al. |
| 5,669,968 | A | 9/1997 | Kobori et al. |
| 5,897,703 | A | 4/1999 | Hatakeyama et al. |
| 5,927,288 | A | 7/1999 | Bensalem et al. |
| 5,976,718 | A | 11/1999 | Melcher |
| 5,979,461 | A | 11/1999 | Bensalem et al. |
| 6,200,381 | B1 | 3/2001 | Rechichi |
| 2004/0131531 | A1 | 7/2004 | Geerlings et al. |
| 2004/0213705 | A1 | 10/2004 | Blencoe et al. |
| 2005/0124754 | A1 | 6/2005 | Schad et al. |
| 2007/0217981 | A1 | 9/2007 | Van Essendelft |
| 2007/0261947 | A1 | 11/2007 | Geerlings et al. |
| 2008/0031801 | A1 | 2/2008 | Lackner et al. |
| 2008/0148939 | A1 | 6/2008 | Fradette et al. |
| 2008/0299024 | A1 | 12/2008 | Gorset et al. |
| 2009/0020044 | A1 | 1/2009 | Constantz et al. |
| 2010/0021362 | A1 | 1/2010 | Hunwick |
| 2010/0047866 | A1 | 2/2010 | Borchert et al. |
| 2010/0084283 | A1 | 4/2010 | Gomez |

FOREIGN PATENT DOCUMENTS

| | | | |
|---|---|---|---|
| EP | 650940 | A1 | 5/1995 |
| EP | 1 147 068 | B1 | 6/2003 |
| EP | 1 741 766 | A1 | 1/2007 |
| GB | 529 128 | A | 11/1940 |
| GB | 1 160 029 | A | 7/1969 |
| GB | 1160029 | | 7/1969 |
| JP | 57-95858 | | 6/1982 |
| JP | 81-98803 | | 8/1996 |
| JP | 2006 076 825 | A | 3/2006 |
| RU | 2102349 | | 1/1998 |
| WO | WO 87/04145 | | 7/1987 |
| WO | WO 97/20784 | | 6/1997 |
| WO | WO 97/20784 | A | 6/1997 |
| WO | WO 98/54107 | | 12/1998 |
| WO | WO 01/51554 | A | 7/2001 |
| WO | WO 01/55049 | | 8/2001 |
| WO | WO 01/55049 | A1 | 8/2001 |
| WO | WO 2007/106883 | | 9/2007 |
| WO | WO 2008/148055 | A | 12/2008 |

OTHER PUBLICATIONS

Annex 3—Part 1, Alphabetical List of Compounds, Sigma Chemical Company, (2 pgs) 1994.

Annex 3—Part 2, Aldrich, Handbook of Fine Chemicals and Laboratory Equipment, 2003-2004, Australia-New Zealand (2 pgs).

Annex 4—Part 1, Material Safety Data Sheet, Magnesium carbonate, USP MSDS (5 pgs) Nov. 1, 2010.

Annex 4—Part 2, U.S. Pharmacopeia, USP Monographs: Magnesium Carbonate, http://www.pharmacopeia.en/v29240/usp29nt24s0_m46680.html, (2 pgs) Aug. 15, 2011.

European Patent Office, EP Application No. 09796581.1-2111 / 2297062, dated Oct. 5, 2011, Third Party Observations (30 pgs).

NPL1, Crystal Growth, The McGraw-Hill Science and Tech Encyclopedia, McGraw-Hill Access Science (9 pgs) Apr. 22, 2007.

NPL3, Crystal habit From Wikipedia, the free encyclopedia (13 pgs) Jul. 19, 2011.

NPL4, Surface area and porosity of primary silicate minerals, American Mineralogist, vol. 85, No. 11-12, pp. 1767-1783, Nov. 2000.

NPL5, On the binder of some ancient mortars, Mineralogy and Petrology, vol. 67, pp. 59-69 (1999).

NPL6, Characterization of ancient magnesian mortars coming from northern Italy, Thermochimica Acta, vol. 321, Issues 1-2, pp. 161-165 (1996).

NPL7, Microstructures of reactive magnesia cement blends, Cement and Concrete Composites, vol. 30, Issue 8, (50 pgs) Sep. 2008.

NPL8, Scaled-up commercial production of reactive magnesia cement pressed masonry units, Part II: Performance of the commercial blocks, Construction and Building Materials, vol. 22, issue 8, (88 pgs) Aug. 2008.

NPL9, Hydromagnesite and dypingite from the Northern Pennine Orefield, Northern England, Proceedings of the Yorkshire Geological Society, vol. 56 (1 pg) (2006).

NPL10, Hydromagnesite Stromatolites and Sediments in an Alkaline Lake, Salda Golu, Turkey, Journal of Sedimentary Research, vol. 66, Issue 5, pp. 991-1002 (1996).

NPL11, Hydromagnesite at www.mindat.org-min-1979, (3 pgs).

NPL13, Industrial Mineral with a future, Geoscience Canada, Source vol. 34, Source Issue 2, (7 pgs) Jun. 2007.

NPL15, Magnacrete Mystery is More Than a Hard Luck Story, Sydney Morning Herald, (2 pgs) May 3, 1988.

Figure 1 shows the x-ray diffraction spectra of hydrated (a) 100% MgO, (b) 80% MgO - 20% MgCO$_3$ and (c) 80% MgO - 20% hydromagnesite samples.

Figure 2: Scanning electron micrograph of a hydrated 100% MgO sample.

Figure 3: Scanning electron micrograph of a hydrated 80% MgO - 20% hydromagnesite sample.

Figure 4: Heat rate profiles from conduction calorimetry of (a) 100% MgO, (b) 80% MgO - 20% $MgCO_3$ and (c) 80% MgO - 20% hydromagnesite samples.

BINDER COMPOSITION

This application is the U.S. national phase of International Application No. PCT/EP2000/001610 PCT/GB2009/001610 filed 26 Jun. 2009 which designated the U.S. and claims priority to European Application No. 08252192.3 filed 26 Jun. 2008, the entire contents of each of which are hereby incorporated by reference.

TECHNICAL FIELD

This invention relates to a cement binder composition, i.e. a composition that is settable to a solid, and to the use of the binder composition in construction products.

BACKGROUND ART

Emissions of 'greenhouse gases', and predominantly carbon dioxide ($CO_2$), are thought to contribute to an increase in the atmospheric and surface temperatures of the Earth—a phenomenon commonly referred to as 'global warming'. Such temperature increases are predicted to have serious environmental consequences. The main contributor to this increase in man-made $CO_2$ is the burning of fossil fuels such as coal and petroleum.

Portland cement is the most common type of cement in general use at this time. It is an essential element of concrete, mortar and non-specialty grouts. Portland cement consists of over 90% Portland cement clinker, up to 5% gypsum and up to 5% other minor constituents. Portland cement clinker is a hydraulic material consisting mainly of dicalcium silicate ($2CaO.SiO_2$), tricalcium silicate ($3CaO.SiO_2$), tricalcium aluminate ($3CaO.Al_2O_3$) and calcium aluminoferrite ($4CaO.Al_2O_3Fe_2O_3$) phases. Magnesium oxide (MgO), can also be present in Portland cement, although its amount must not exceed 5% by mass as its delayed hydration is believed to give rise to unsoundness in concrete. Gypsum ($CaSO_4.2H_2O$) is added to Portland cement clinker to control its setting time, and the mixture is ground to give a fine powder. On reaction with water, the constituents of the cement hydrate forming a solid complex calcium silicate hydrate gel and other phases.

The manufacture of Portland cement (PC) is a highly energy intensive process that involves heating high volumes of raw materials to around 1450° C. In addition to the $CO_2$ generated from burning fossil fuels to reach these temperatures, the basic raw material used in making Portland cement is calcium carbonate (limestone, $CaCO_3$), and this decomposes during processing to CaO, releasing additional geologically sequestered $CO_2$. As a result, the manufacture of Portland cement emits approximately 1 tonne $CO_2$ for every tonne of cement produced and is responsible for approximately 5% of all anthropogenic $CO_2$ emissions.

Binders based on systems other than calcium oxide and silicates are known. For example Sorel cement (magnesium oxychloride cement or magnesia cement) is a hydraulic cement that is a mixture of magnesium oxide (burnt magnesia, MgO) and magnesium chloride together with filler materials like sand or crushed stone. It sets to a very hard abrasive-resistant material and so is used for grindstones, tiles, artificial stone (cast stone) and cast floors, in which application it has a high wear resistance. However its chief drawback is its poor resistance to water, making it unsuitable for external construction applications.

Other magnesium based cements include magnesium oxysulfate cement and magnesium phosphate cements but both these have drawbacks, the former having a poor water resistance and the latter sets very fast so that it is difficult to work with.

GB-1160029 discloses cements based on mixing magnesium oxide (MgO), sodium chloride (NaCl) or sodium nitrate ($NaNO_3$) and calcium carbonate ($CaCO_3$). $CaCO_3$ is used as a "moderating substance" to enable the salt and the MgO to perform the chemical reactions necessary to set, which are similar to those of the other Sorel cements. These cements require the use of hard-burnt MgO, which is generally produced by high-temperature treatment (~1000° C.) of magnesite ($MgCO_3$), which causes $CO_2$ emissions not only from the calcining of magnesite but also from the burning of fossil fuel.

U.S. Pat. No. 5,897,703 discloses binder compositions based on mixing MgO with a hardening agent, propylene carbonate. The magnesium oxide used can be any mixture of soft-burnt and hard-burnt MgO. It is known that in the presence of water, propylene carbonate decomposes to carbon dioxide and propylene glycol and so the addition of the propylene carbonate provides a source of $CO_2$ to carbonate the magnesium oxide.

U.S. Pat. No. 6,200,381 discloses a dry powdered cement composition derived from dolomite (a magnesium and calcium carbonate mineral; $MgCO_3.CaCO_3$). The dolomite is heated to decarbonate the $MgCO_3$ so that the composition contains $CaCO_3$ and a partially decarbonated $MgCO_3$, i.e. a mixture of $MgCO_3$ and MgO. Certain additives may be included in the composition (e.g. aluminium sulphate ($Al_2(SO_4)_3$), citric acid, sulphuric acid ($H_2SO_4$), NaCl, etc.), which assist the composition to set on addition of water; the water may be contaminated water, e.g. sea water. The $CaCO_3$ component of the cement composition reacts with several of the specified additives that are used. For example, the addition of $H_2SO_4$ will react with $CaCO_3$ yielding hydrated $CaSO_4$ (e.g. $CaSO_4.2H_2O$) and $CO_2$. The $CO_2$ released assists the carbonation of MgO and $Mg(OH)_2$. NaCl may be added before the thermal treatment of dolomite to decrease the decarbonation temperature of $MgCO_3$, and in the binder composition as an additive, where it appears to assist in achieving an early strength to the composition, which is probably due to reactions with MgO (Sorel cement type reactions). $CaCO_3$ acts as a "moderating substance" to enable NaCl and the MgO to perform the necessary chemical reactions (see GB1160029 above).

U.S. Pat. No. 1,867,180 describes a cement composition based on slaked lime ($Ca(OH)_2$) that contains less than 1% MgO and NaCl.

U.S. Pat. No. 1,561,473 discloses that, when a wet mixture of aggregates and magnesium oxide is treated with gaseous or dissolved $CO_2$, its tensile strength is improved. The composition must be exposed to $CO_2$ when wet and the patent discloses the exposure of the wet mixture to a special atmosphere of moist $CO_2$.

WO 01/55049 discloses a dry powdered cement composition containing MgO, a hydraulic cement, such as Portland cement, Sorel cements or calcium aluminate cements, and optionally pozzolanic materials. The cement composition can also contain various additives such as ferrous sulphate ($FeSO_4$), sodium or potassium silicates or aluminates, phosphoric acid ($HPO_3$) or phosphoric acid salts, copper sulphate ($CuSO_4$), and various other organic polymers and resins, such as polyvinyl acetate (PVA), vinylacetate-ethylene, styrene-butyl acrylate, butyl acrylate-methylacrylate, and styrene-butadiene. The magnesium oxide is obtained by low temperature calcining.

GB-529128 discloses the use of magnesium carbonate as an insulating material; it is made from concentrated sea water containing magnesium salts by precipitating the salts with alkali metal carbonates, which forms needle-like crystals that can set. A slurry of such crystals, when paced in a mould, will set to provide a slab or block that is useful as insulation. If there are any bicarbonate ions in the alkali metal carbonate, magnesium bicarbonate will form in the above reaction, which slows down the setting reaction. In order to counteract this, 1-5% magnesium oxide may be added, which will precipitate the bicarbonate as magnesium carbonate.

U.S. Pat. No. 1,819,893 and U.S. Pat. No. 1,971,909 disclose the use of magnesium hydroxide or a mixture of magnesium hydroxide and calcium carbonate as an insulating material since such magnesium hydroxide is light and highly flocculated.

U.S. Pat. No. 5,927,288 discloses that a mixture of hydromagnesite and magnesium hydroxide, when incorporated into a cigarette paper, reduces sidestream smoke. The hydromagnesite/magnesium hydroxide compositions have a rosette morphology and the hydromagnesite/magnesium hydroxide mixture is precipitated from a solution of magnesium bicarbonate and possible other soluble magnesium salts by adding a strong base, e.g. potassium hydroxide.

EP-0393813 and WO 01/51554 relate to flame retardants for plastics. EP-0393813 discloses that a mixture of a double salt of calcium and magnesium carbonate (e.g. dolomite), hydromagnesite, and magnesium hydroxide can provide flame resistance to thermoplastics, e.g. a sheath of an electric wire. WO01/51554 teaches the addition of various magnesium salts, including hydromagnesite and magnesium hydroxide, to polymers.

US2009/0020044 discloses the capture of carbon dioxide by sea water to precipitate carbonates, which can be used in hydraulic cements; up to 10% of a pH regulating material, including magnesium oxide or hydroxide, can be added to the cement to regulate the pH.

JP2006 076825 is concerned with reducing the amount of $CO_2$ emitted from power stations and by the steel industry. It proposes capturing the $CO_2$ by reaction with ammonium hydroxide to form ammonium carbonate:

$$2NH_4OH + CO_2 \rightarrow (NH_4)_2CO_3 + H_2O$$

Meanwhile magnesium chloride is made by reacting magnesium oxide and hydrochloric acid $$MgO + 2HCl \rightarrow MgCl_2 + H_2O$$

The magnesium chloride is reacted with the ammonium carbonate, which precipitates magnesium carbonate leaving a liquor containing dissolved ammonium chloride:

$$(NH_4)_2CO_3 + MgCl_2 \rightarrow 2(NH_4)Cl + MgCO_3$$

The precipitated magnesium carbonate is filtered out and used as a cement component while the ammonium chloride liquor is treated to regenerate ammonium hydroxide and hydrochoric acid.

Apart from the intrinsic benefit of reducing $CO_2$ emissions, it is likely that $CO_2$ emissions by the cement industry will be regulated in an attempt to reduce environmental damage. Therefore, there is a real need to develop a new range of cementitious binders that are associated with minimal or even negative $CO_2$ emissions. Such binders could be 'carbon neutral' if they are able to counteract or balance the release of $CO_2$ in the process of their production by absorbing $CO_2$ during a hardening stage following hydration; or 'carbon negative' if they are able to absorb and store more $CO_2$ than was released during their production.

DISCLOSURE OF THE INVENTION

The invention is set out in the claims.

This invention provides a cement binder composition based on MgO plus special magnesium carbonates (see Formula I below). The magnesium oxide used can be soft-burnt MgO, hard-burnt MgO, or any mixture of soft-burnt and hard-burnt MgO. A key ingredient of the cement composition is the special magnesium carbonate (either hydrated or unhydrated) in the form $$xMgCO_3 \cdot yMg(OH)_2 \cdot zH_2O \qquad \text{Formula I}$$

where x is a number greater than 1, and at least one of y or z is a number greater than 0; the carbonate may be non-stoichiometric; x, y and z may be (but need not be) integers. The composition may also comprise a hydroscopic material, such as NaCl.

The above formula I excludes the use of magnesite ($MgCO_3$) and dolomite ($MgCO_3 \cdot CaCO_3$) as the principal source of magnesium carbonate. However, the composition can contain minor amounts of these minerals, e.g. up to 25% of the total magnesium carbonate content of the composition. It is preferred that substantially all the magnesium carbonate content of the composition is in accordance with Formula I. In one embodiment, the carbonate of the general formula I is hydromagnesite, which has the general formula $4MgCO_3 \cdot Mg(OH)_2 \cdot 4H_2O$, although some degree of non-stoichiometry can be tolerated, e.g. x in the above formula I can be 3.5-4.5, y can be 0.5-1.5 and z can be 3.5.-5.5. In addition, x, y and z may all be greater than 0.

The composition is preferably in the form of a dry powder that can be mixed with water, optionally together with other ingredients such as sand, gravel or other fillers (e.g. fly ash), to form a slurry of varying consistency that will set, i.e. the composition of the present invention is a hydraulic binder/cement. The wet composition can be made plastic and workable by the addition of plasticisers.

In accordance with a further embodiment, the composition may include $Mg(OH)_2$ in place of some or all of the MgO. The $Mg(OH)_2$ used should preferably have the low crystallinity, high surface area and the rosette-like morphology described below. Such $Mg(OH)_2$ may be produced by pre-hydrating MgO in the presence of the special magnesium carbonates of the general formula I. However, a minor part of any $Mg(OH)_2$ in the composition, e.g. below 50% of the total $Mg(OH)_2$ content, may have a platelet morphology shown in FIG. 2. The $Mg(OH)_2$ morphology formed in accordance with the present invention has a higher surface area per unit weight than $Mg(OH)_2$ having a platelet morphology; the latter will normally have a surface area of less than 45 $m^2/g$ whereas the former has a surface area of at least 45 $m^2/g$, generally higher than 70 $m^2/g$ (surface area values were measured according to the Brunauer-Emmett-Teller (BET) method).

The presence of $Mg(OH)_2$ in the binder composition in place of MgO reduces the green strength and the set strength of the hydrated binder because most of the strength of the binder of the present invention results from MgO hydration, but this is acceptable in certain applications, e.g. in mortars or plasters; an excessively strong mortar for bonding together blocks and bricks in the construction of walls can cause the development of hairline cracks from shrinkage or from minor structural movement. The use of such $Mg(OH)_2$ also extends the time before a mortar will set, which is useful in plaster and mortar.

The binder composition of the present invention sets and hardens when mixed with water and this is believed to take place in two stages:

Firstly when the composition is initially mixed with water, the MgO hydrates in the presence of the special magnesium carbonates forming $Mg(OH)_2$ crystals that are significantly less crystalline, have higher surface area and a rosette-like morphology, which increases the green strength of the cement sample. The term 'green strength' refers to the initial strength of the cement sample over a period of 6 hours. The addition of the special magnesium carbonates of Formula I to MgO alters its hydration mechanism, and leads to the formation of the $Mg(OH)_2$ crystals with the different physical and microstructural properties as described above. The effect of the special magnesium carbonate of Formula I to MgO hydration will be described in further detail later. The rosette morphology of the $Mg(OH)_2$ crystals has $Mg(OH)_2$ plates that are connected to each other but are angled with respect to each other, thereby forming spaces between the plates. However, it is possible that some of the $Mg(OH)_2$ crystals produced are contained within and, at the outer edges of, the rosette folds of the originally included hydromagnesite crystals.

Secondly, the hydrated material, over time, absorbs $CO_2$ from the atmosphere to form one or more magnesium carbonate phases, such as hydromagnesite ($4MgCO_3 \cdot Mg(OH)_2 \cdot 4H_2O$), dypingite ($4MgCO_3 \cdot Mg(OH)_2 \cdot 5H_2O$), nesquehonite ($MgCO_3 \cdot 3H_2O$) and lansfordite ($MgCO_3 \cdot 5H_2O$), which further increases sample strength. The addition of the special magnesium carbonates of Formula I to MgO significantly increases the carbonation rate of the $Mg(OH)_2$ crystals produced during MgO hydration. This is explained in further detail later.

The addition of a hygroscopic material such as NaCl or other chlorides further increases the carbonation rate of the $Mg(OH)_2$ crystals by providing the necessary humidity for the carbonation reactions. Therefore, this MgO-based binder composition has the potential to absorb up to 1.09 tonne of $CO_2$ for every tonne of MgO included in its composition when hardening. The amount of the chloride salt may be up to 10%, e.g. up to 5%, such as up to 3%, based on the combined weight of (a) magnesium oxide, (b) magnesium carbonate of the general formula I and (c) the chloride salt. The chloride salt is optional but, when present may form at least 1%, e.g. at least 2%, such as at least 3%, of the combined weight of (a) to (c).

The components may be mixed in situ and so the present invention provides a combination of (a) a quantity of magnesium oxide, (b) a quantity of magnesium carbonate of the general formula I and optionally (c) a quantity of the chloride salt. The combination may also include instructions to combine the components in the quantities discussed in the present specification in connection with the ready-mixed composition.

DETAILED DESCRIPTION AND BEST MODE FOR CARRYING OUT THE INVENTION

In the description below, hydromagnesite ($4MgCO_3 \cdot Mg(OH)_2 \cdot 4H_2O$), a man-made magnesium carbonate, is used as an example to describe the invention. However, any material having the formula I:

$$xMgCO_3 \cdot yMg(OH)_2 \cdot zH_2O,$$

wherein x is at least 1 and at least one of y or z is greater than 0 may be used instead or in addition to hydromagnesite. For example; x may be 1, 2, 3, 4, or 5, and y and z may for example each independently be 0, 1, 2, 3, 4, or 5, providing that at least one of y or z is greater than 0, e.g. dypingite ($4MgCO_3 \cdot Mg(OH)_2 \cdot 5H_2O$), nesquehonite ($MgCO_3 \cdot 3H_2O$) and lansfordite ($MgCO_3 \cdot 5H_2O$). Many of the carbonates of the formula I are metastable and will transform over time to hydromagnesite.

Materials of the general formula I are known but do not occur naturally. Methods of manufacturing these compounds are well-known, but generally they can be made by exposure of magnesium compounds, e.g. MgO or $Mg(OH)_2$ (or mixtures of thereof) to $CO_2$ under a variety of conditions.

It is believed that the usual hydration mechanism of MgO proceeds as follows

Stage 1: Water adsorbs at the MgO surface and diffuses inside porous MgO particles;

Stage 2: MgO dissolution occurs within the particles, changing particle porosity with time;

Stage 3: Creation of supersaturation, and occurrence of nucleation and growth of $Mg(OH)_2$ at the oxide surface.

The rate of MgO hydration is believed to be controlled by the extent of MgO dissolution. The $Mg(OH)_2$ produced during MgO hydration is deposited in the pores of the MgO particles, creating a $Mg(OH)_2$ film that imposes an increasing resistance to the hydration process.

The above hydration mechanism is altered when a magnesium carbonate of the formula I, e.g. hydromagnesite, is added to the MgO. Without wishing to be bound by theory, the addition of for example hydromagnesite is believed to reduce the formation of the $Mg(OH)_2$ film on the MgO surface so that the MgO hydration can proceed unimpeded. The different MgO hydration mechanism achieved due to the addition of the special magnesium carbonates of Formula I to MgO leads to the formation of the $Mg(OH)_2$ crystals with the different set of physical and microstructural properties as described above.

Figure 1:
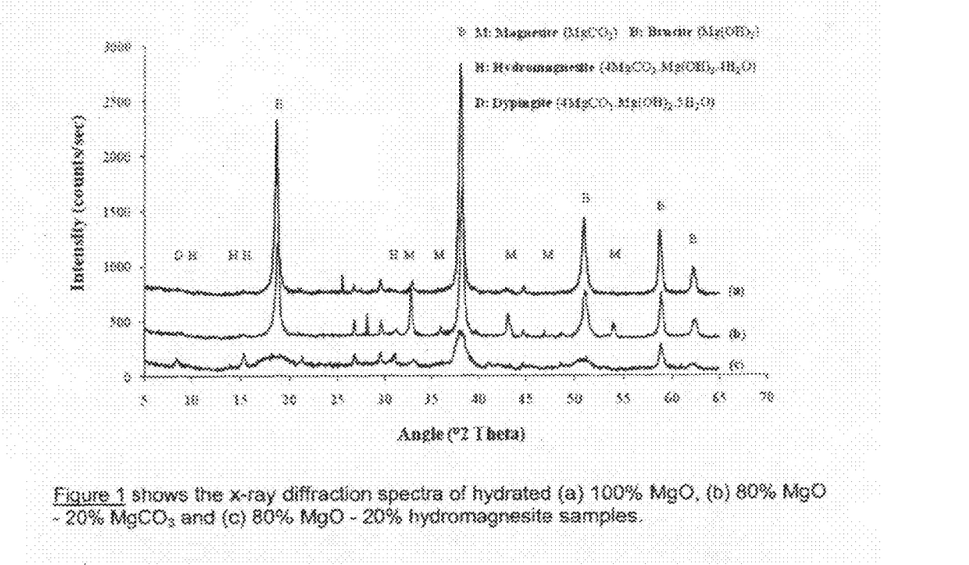
FIG. 1 shows the x-ray diffraction spectra of hydrated (a) 100% MgO, (b) 80% MgO-20% $MgCO_3$ and (c) 80% MgO-20% hydromagnesite samples.

FIG. 1 shows the x-ray diffraction spectra of (a) hydrated 100% MgO sample, (b) hydrated 80% MgO-20% $MgCO_3$ sample and (c) hydrated 80% MgO-20% hydromagnesite sample. The $Mg(OH)_2$ diffraction peaks of samples (a) 100% MgO, and (b) 80% MgO-20% $MgCO_3$ (i.e. not in accordance with the invention) are narrow with high intensity, indicating high crystallinity. In contrast, the $Mg(OH)_2$ diffraction peaks in the 80% MgO-20% hydromagnesite sample are significantly broader with low intensity, thus denoting the presence of semi-crystalline crystals.

Figure 2:
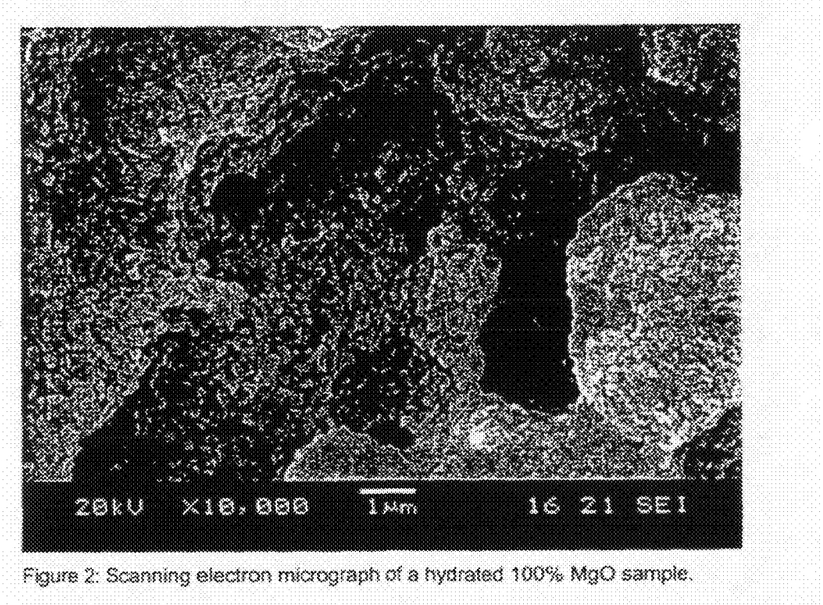
FIG. 2 shows a scanning electron micrograph of a hydrated 100% MgO sample.
Figure 3:
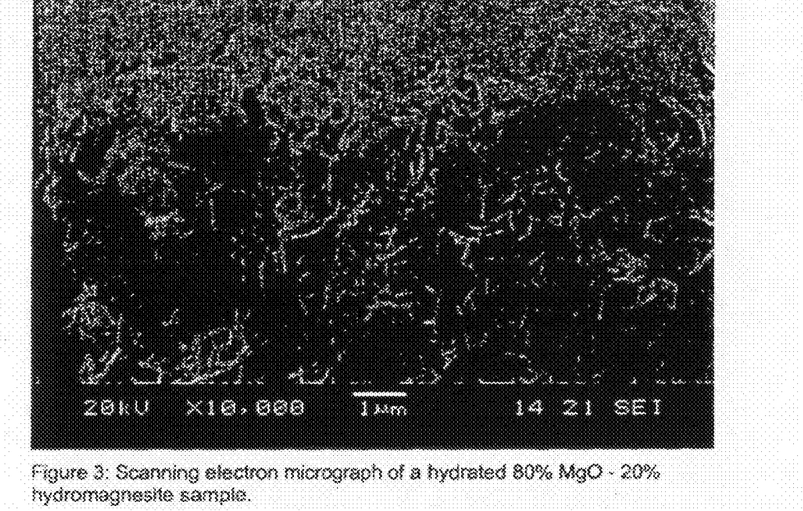
FIG. 3 shows a scanning electron micrograph of a hydrated 80% MgO-20% hydromagnesite sample.

FIG. 2 shows a scanning electron micrograph (SEM) of a hydrated 100% MgO sample. The $Mg(OH)_2$ forms 'platelet-type' aggregates. The platelets lie on top of each other and the upper platelets occlude the lower platelets. In contrast, FIG. 3 shows a 'rosette-type' crystal structure formed when MgO is hydrated in the presence of hydromagnesite.

Figure 4:
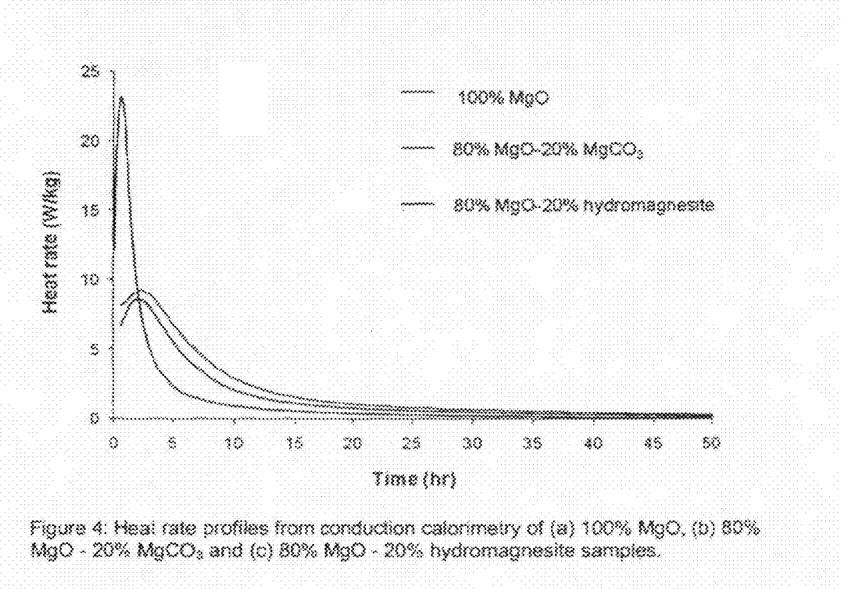
FIG. 4 compares the heat rate profile from conduction calorimetry of (a) 100% MgO, (b) 80% MgO-20% $MgCO_3$ and (c) 80% MgO-20% hydromagnesite samples.

FIG. 4 shows the heat rate profiles upon hydration of (a) 100% MgO sample, (b) 80% MgO-20% $MgCO_3$ sample and (c) 80% MgO-20% hydromagnesite samples. The replacement of some of the MgO by magnesite ($MgCO_3$) (sample b) does not change the hydration behaviour of MgO (sample a)

as depicted by the similar maximum heat rate and time to maximum heat rate. However, when hydromagnesite ($4MgCO_3 \cdot Mg(OH)_2 \cdot 4H_2O$) is added to MgO (sample c), it significantly accelerates MgO hydration increasing the maximum heat rate by ~150% and decreasing the time to maximum heat rate by ~70%. The naturally-occurring magnesite ($MgCO_3$) does not alter the MgO hydration as discussed above and should not be used as the principal magnesium carbonate source.

When the magnesium carbonate of the formula I ($xMgCO_3 \cdot yMg(OH)_2 \cdot zH_2O$, wherein x is at least 1 and one of y or z is greater than 0, for example hydromagnesite), is included in the composition, it significantly accelerates the carbonation rate of $Mg(OH)_2$, which is believed to be due to the following reasons:

1. The addition of special magnesium carbonates, for example hydromagnesite, provides nucleation sites for accelerated carbonate formation.
2. The formation of $Mg(OH)_2$ crystals with a rosette-like morphology increases the surface area exposed to carbonation and provides space for the carbonate products formed.

These factors speed up the rate of the carbonation reaction and allows the binder composition to reach its final strength more quickly. During natural carbonation of hydrated 100% MgO and 80% MgO-20% hydromagnesite powder samples, the following results are achieved:

90% carbonation of the 80% MgO-20% hydromagnesite sample in less than 9 days versus over 50 days for the 100% MgO sample (conditions: 98% relative humidity/ 0.03% $CO_2$ level)

70% carbonation of the 80% MgO-20% hydromagnesite sample in less than 28 days versus over 45 days for the 100% MgO sample (conditions: 65% relative humidity/ 0.03% $CO_2$ level)

The optional addition of a hydroscopic material, such as NaCl or other chlorides, to the composition may be useful in low humidity conditions to assist in the absorption of moisture from the environment. However, due to the risk of corrosion, these salts should only be included in compositions which will not be in contact with metals, such as steel-reinforcements in concrete structures.

The high $CO_2$ absorption ability of MgO (up to 1.09 tonne of $CO_2$/tonne MgO) offers the unique potential to develop "carbon negative" concrete and concrete products, namely products that absorb carbon overall (taking into account both its production and its use) and may have a net absorption of as much as 0.59 tonnes of $CO_2$ per tonne of MgO, which is the main constituent of the binder. Of course the exact net absorption of the binder will depend on the method used to manufacturing the MgO that is used. In contrast, the production of Portland cement releases 1 tonne $CO_2$/tonne cement and as a binder, Portland cement is only able to absorb 0.12-0.51 tonne of $CO_2$/tonne binder, producing a net emission of 0.49 to 0.88 tonnes of $CO_2$ per tonne of binder. These figures for $CO_2$ production include the emissions due to the burning of fossil fuel in the production processes The following embodiments represent example compositions of the binder of the present invention; in all these compositions the addition of a chloride salt is optional and a substantial proportion of any $Mg(OH)_2$ added has the rosette morphology, high surface area and low crystallinity discussed above.

The composition of the present invention comprises, by weight:
(a) 10% to 95%, e.g. 10% to 85%, for example 30% to 80%, such as 40% to 70% magnesium oxide (MgO) and/or magnesium hydroxide ($Mg(OH)_2$);
(b) 5% to 80%, e.g. 10% to 60%, for example 20% to 40%, such as 20% to 30% of one or more magnesium carbonate of Formula I; and
(c) 0% to 10% chloride salt
based on the total weight of components (a) to (c).

The amount of MgO and/or ($Mg(OH)_2$ may be greater than 10%, e.g. 15% or more.

Typical sub-ranges of the cement composition are (by weight) for different applications:
a) 70% to 95% magnesium oxide (MgO) and/or magnesium hydroxide ($Mg(OH)_2$);
(b) 5% to 20% of one or more magnesium carbonate of Formula I, and
(c) 0% to 10% chloride salt
based on the total weight of components (a) to (c).
or
(a) 30% to 80% magnesium oxide (MgO) and/or magnesium hydroxide ($Mg(OH)_2$);
(b) 20% to 60% of one or more magnesium carbonate of Formula I; and
(c) 0% to 10% chloride salt
based on the total weight of components (a) to (c).
or
(a) 10% to 40% magnesium oxide (MgO) and/or magnesium hydroxide ($Mg(OH)_2$);
(b) 60% to 80% of one or more magnesium carbonate of Formula I; and
(c) 0% to 10% chloride salt
based on the total weight of components (a) to (c).
or
(a) 40% to 85% magnesium oxide (MgO);
(b) 5% to 30% magnesium hydroxide ($Mg(OH)_2$);
(c) 10% to 20% of one or more magnesium carbonate of Formula I; and
(d) 0% to 10% chloride salt
based on the total weight of components (a) to (d).
or
(a) 20% to 75% magnesium oxide (MgO);
(b) 5% to 30% magnesium hydroxide ($Mg(OH)_2$);
(c) 20% to 40% of one or more magnesium carbonate of Formula I; and
(d) 0% to 10% chloride salt
based on the total weight of components (a) to (d).
or
(a) 10% to 60% magnesium oxide (MgO);
(b) 30% to 50% magnesium hydroxide ($Mg(OH)_2$);
(c) 10% to 30% of one or more magnesium carbonate of Formula I;
and
(d) 0% to 10% chloride salt
based on the total weight of components (a) to (d).
or
(a) 30% to 90% magnesium hydroxide ($Mg(OH)_2$);
(b) 10% to 60% of one or more magnesium carbonate of Formula I; and
(c) 0% to 10% chloride salt
based on the total weight of components (a) to (c).
or
(a) 75% to 90% magnesium oxide (MgO)
(b) 10% to 20% of one or more magnesium carbonate of Formula I; and (c) 0% to 5% chloride salt
based on the total weight of components (a) to (c).
or
(a) 65% to 80% magnesium oxide (MgO)
(b) 20% to 30% of one or more magnesium carbonate of Formula I; and
(c) 0% to 5% chloride salt
based on the total weight of components (a) to (c).
or
(a) 55% to 70% magnesium oxide (MgO)
(b) 30% to 40% of one or more magnesium carbonate of Formula I; and
(c) 0% to 5% chloride salt
based on the total weight of components (a) to (c).
or
(a) 45% to 60% magnesium oxide (MgO)
(b) 40% to 50% of one or more magnesium carbonate of Formula I; and
(c) 0% to 5% chloride salt
based on the total weight of components (a) to (c).
or
(a) 35% to 50% magnesium oxide (MgO)
(b) 50% to 60% of one or more magnesium carbonate of Formula I; and
(c) 0% to 5% chloride salt
based on the total weight of components (a) to (c).
or
(a) 25% to 40% magnesium oxide (MgO)
(b) 60% to 70% of one or more magnesium carbonate of Formula I; and
(c) 0% to 5% chloride salt
based on the total weight of components (a) to (c).

In the above compositions all the $Mg(OH)_2$ is made by hydrating MgO in the presence of one or more magnesium carbonate of Formula I.

In the above compositions, compositions with higher percentages of MgO and $Mg(OH)_2$ (and lower percentages of magnesium carbonate of Formula I) tend to have a higher strength under compression but require a greater $CO_2$ output to make the MgO and $Mg(OH)_2$ while the compositions with lower percentages of MgO and $Mg(OH)_2$ (and higher percentages of magnesium carbonate of Formula I) tend to have a lower strength under compression but require less $CO_2$ output to make.

The preferred particle size of the magnesium carbonates is between 0.01-800 μm in diameter, and preferably between 0.01 and 600 μm in diameter, in order to achieve a good reaction rate.

The particle size of the MgO/$Mg(OH)_2$ may be between 0.01-800 μm in diameter, and preferably between 0.01 and 100 μm in diameter, in order to achieve a good reaction rate.

As mentioned above, the composition comprising $Mg(OH)_2$ is produced by mixing water with MgO, magnesium carbonate of Formula I and optionally NaCl and plasticisers, i.e. the MgO composition of the present invention. The composition may be allowed to set to form a dry solid mass. Alternatively, if a large amount of water is added, the $Mg(OH)_2$ will precipitate and the precipitate can be collected together with the magnesium carbonate. In either case, the composition containing $Mg(OH)_2$ can then be ground to a specific particle size distribution. These compositions can then be further blended with additional MgO and magnesium carbonates of Formula I if desired.

Although the hydroscopic material, for example NaCl, can be present in the binder composition, it can be added in the water used to wet the composition and accordingly it is possible to use, at least in part, seawater to make up a wet cement with the composition of the present invention.

The amount of water added to the composition can be freely chosen, depending on the mix plasticity required and the final intended use. Based on the total weight of the binder components, the amount of water can for example be 5-120%, e.g. 5-80%, depending on the expected use.

Additives may be mixed with the binder of the present invention either when in powder or in the course of making a cement slurry. The binder composition has a pH of about 10.2 (although it can vary within a range depending on the presence of other oxides or hydroxides impurities in the composition); this is generally lower than Portland cement. This low pH makes it possible to use a wide range of aggregates, including waste aggregates, such as glass aggregates, and other fillers when the binder is used to make construction products, whilst minimising the chance of disruptive reactions, e.g. alkali silica reactions. Other fillers or extenders can be used, e.g. siliceous materials such as fly ash. Suitable aggregates are for example gravel, sand, glass, and other waste products. The amount (w/w) of waste aggregates and other fillers and additives can be e.g. 0-99% of the total dry weight of the composition, depending on the expected use. The exact amount of aggregates and fillers in the binder composition will depend on the desired application. Generally, in concrete and mortars and other compositions containing aggregates, the weight of the binder components (the magnesium oxide/hydroxide and the magnesium carbonate of the formula I, optionally together with the chloride salt) will be 1-70%, e.g. 5-60%, for example 10-40%, including 15-30%, of the total dry weight of the composition, i.e. the combined weight of the binder components and of the aggregates/binders.

The binder composition of the present invention may consist substantially of:
(a) 10% to 95% MgO; and
(b) 5% to 80% magnesium carbonate of the above formula I;
(c) 0% to 10% chloride salt and other additives.

An aggregate-containing composition (e.g. concrete and mortar) of the present invention may consist substantially of:
up to 99% aggregates and other fillers and additives, with the balance being:
(a) 10% to 95% MgO; and
(b) 5% to 80% magnesium carbonate of the above formula I;
(c) 0% to 10% chloride salt.

The workability of a binder-water system can be improved by the addition of super-plasticisers, such as lignosulfonates, sulfonated naphthalene, sulfonated melamine formaldehyde, polyacrylates and polycarboxylate ethers. Superplasticisers are particularly useful when a low amount of water is added to the composition in order to obtain a stronger hardened binder product. The low addition of water will result in a stiff composition which is difficult to work with. However, the inclusion of a superplasticiser enables the water-binder system to retain good workability and eases its use and placement Between 0 and 5%, for example between 0.5 and 2.5% of superplasticiser by dry weight of the binder composition (combined weight of MgO, $Mg(OH)_2$ and magnesium carbonate of Formula I) may be added. Other additives usual in binders, cements, concretes, mortars and plasters in amounts up to 10% by dry weight of the binder composition (combined weight of MgO, $Mg(OH)_2$ and magnesium carbonate of Formula I) may be added for example between 0 and 5%, e.g. between 0.5 and 2.5%.

The binder composition of the present invention could be mixed with other binders, e.g. Portland cement and/or lime, but the advantages of the present invention, especially in reducing overall carbon dioxide emissions, are reduced by doing so. For this reason other hydraulic binders in the compositions of the present invention should preferably not be added but if they are added the amount of such other binders should be kept low, e.g. less than the overall weight of components (a) to (c) of the present invention, such as less than 50% (including amounts less than 25%) of the overall dry weight of the binder components (a) to (c).

The binder can be used in many different types of construction product, but usually it is used in porous or semi-porous products, for example dense or lightweight blocks, porous breeze block type products, bricks, tiles, concrete roof tiles, and mortar. However, the binder can also be used in a wide range of other applications where Portland cement is used, e.g. to form screed floors.

All the reactions occurring in the manufacture and setting of these construction products are reversible. For example partly carbonated construction products can be crushed and the recovered binder containing magnesium carbonates recycled to MgO by calcining (heating). Alternatively, the partly carbonated construction products can be crushed, optionally further carbonated, and then mixed with additional MgO to make new products that are of the same high value, unlike Portland cement, which is only recyclable to low value products. Relatively low loss of strength is observed when the products of the present invention are recycled and again made into construction products.

The binder has a white colour, which is retained even once the material has become hydrated and carbonated. This feature allows the binder composition to be used for premium construction products, where a white colour is required. Alternatively, a pigment may be added to form coloured products and the white base colour of the binder produces a better base for coloured products than grey Portland cement.

The present invention is now described with reference to the following non-limiting examples:

In practising preferred forms of the present invention, soft-burnt MgO with a mean particle size of 10 μm was used. Magnesium carbonates used included hydromagnesite with a mean particle size of 16 μm, and $MgCO_3$ with a particle size of 17 μm. In addition, fine sand with a mean particle size of 250 μm was also used. The MgO and magnesium carbonates were initially dry mixed to homogenise. When aggregates were added to the mix, they were first dry mixed with the cementitious binder before adding the water. NaCl and the superplasticiser were added in the cement or cement-aggregates systems with the mixing water.

Example 1

20 g of soft-burnt MgO and 5 g of hydromagnesite were mixed with 229 g of glass sand. 1.3 g of NaCl was dissolved in 31 g of water and the solution was mixed with the dry solids for 5 min. The final mass was pressed using a hydraulic press to form a 50 mm cubic sample. The sample was stored at ambient conditions (40%-60% relative humidity) and achieved compressive strength of 4.5 MPa after 28 days.

Example 2

15 g of soft-burnt MgO, 5 g of hydromagnesite, and 5 g of $MgCO_3$ were mixed with 229 g of glass sand. 0.6 g of NaCl was dissolved in 28 g of water and the solution was mixed with the dry solids for 5 min. The final mass was pressed using a hydraulic press to form a 50 mm cubic sample. The sample was stored at ambient conditions (40%-60% relative humidity) and achieved compressive strength of 4.2 MPa after 28 days.

Example 3

80 g of soft-burnt MgO and 20 g of hydromagnesite were mixed with 400 g of glass sand. 0.6 g of NaCl was dissolved in 120 g of water and the solution was mixed with the dry solids for 5 min. The final mass was poured and vibrated to form 50 mm cubic samples. The samples were stored at ambient conditions (40% relative humidity) and achieved compressive strength of 2.6 MPa after 1 day.

Example 4

80 g of soft-burnt MgO and 20 g of hydromagnesite were mixed with 120 g of water for 5 min. The final mass was poured and vibrated to form 50 mm cubic samples. The samples were stored at 5% $CO_2$ and 90% RH and achieved compressive strength of 10 MPa after 5 days.

Example 5

80 g of soft-burnt MgO, 20 g of hydromagnesite and 100 g of fine sand were mixed with 90 g of water and 20 ml of a sulfonated naphthalene plasticiser for 5 min. The final mass was poured and vibrated to form 50 mm cubic samples. The samples were stored at ambient conditions (40% relative humidity, 0.03% $CO_2$) and achieved compressive strength of 25 MPa after 28 days.

The compressive strength of composite materials made using the binder of the present invention tend to be lower than composite materials made using Portland cement but there are applications where Portland cement is used that do not require high compressive strength, e.g. in mortar and breeze blocks, and the present invention provides adequate strength for such applications while requiring a lower net $CO_2$ output (such output may even be negative).

In contrast to Sorel cements, the binders of the present invention are stable in the presence of water.

The invention claimed is:

1. A hydraulic binder composition in the form of a dry powder comprising:
   (a) 10% to 95% MgO; and
   (b) 5% to 80% magnesium carbonate;
   (c) up to 10% chloride
   based on the total weight of components (a) to (c)
   wherein the magnesium carbonate is in the form
       $xMgCO_3 \cdot yMg(OH)_2 \cdot zH_2O$
   wherein x is a number that is at least 1, and at least one of y or z is a number that is greater than 0.

2. A hydraulic binder composition as claimed in claim 1, wherein in the formula $xMgCO_3 \cdot yMg(OH)_2 \cdot zH_2O$,
   x is a number in the range of 3.5-4.5,
   y is a number in the range of 0.5-1.5, and
   z is a number in the range of 3.5-5.5.

3. A hydraulic binder composition as claimed in claim 1, wherein in the formula $xMgCO_3 \cdot yMg(OH)_2 \cdot zH_2O$,
   x is 4,
   y is 1, and
   z is 4 or 5.

4. A hydraulic binder composition as claimed in claim 1, wherein the magnesium carbonate is in the form
       $xMgCO_3 \cdot zH_2O$
   wherein x is at least 1, and
   z is greater than 0.

5. A hydraulic binder composition as claimed in claim 1, wherein in the formula $xMgCO_3 \cdot yMg(OH)_2 \cdot zH_2O$:
x, y, z are all greater than 0.

6. A hydraulic binder composition as claimed in claim 1, wherein the magnesium carbonate is hydromagnesite.

7. A hydraulic binder composition as claimed in claim 1, wherein the chloride is NaCl.

8. A binder composition as claimed in claim 1, comprising MgO and/or $Mg(OH)_2$, magnesium carbonate and optionally chloride in an amount selected from one of the following ranges:
i)
(a) 70% to 95% magnesium oxide (MgO);
(b) 5% to 20% of one or more magnesium carbonate; and
(c) up to 10% chloride
based on the total weight of components (a) to (c);
ii)
(a) 30% to 80% magnesium oxide (MgO);
(b) 20% to 60% of one or more magnesium carbonate; and
(c) up to 10% chloride
based on the total weight of components (a) to (c);
iii)
(a) 10% to 40% magnesium oxide (MgO);
(b) 60% to 80% of one or more magnesium carbonate; and
(c) up to 10% chloride
based on the total weight of components (a) to (c);
iv)
(a) 40% to 85% magnesium oxide (MgO);
(b) 5% to 30% magnesium hydroxide ($Mg(OH)_2$);
(c) 10% to 20% of one or more magnesium carbonate;
(d) up to 10% chloride
based on the total weight of components (a) to (d);
v)
(a) 20% to 75% magnesium oxide (MgO);
(b) 5% to 30% magnesium hydroxide ($Mg(OH)_2$);
(c) 20% to 40% of one or more magnesium carbonate; and
(d) up to 10% chloride
based on the total weight of components (a) to (d);
vi)
(a) 10% to 60% magnesium oxide (MgO);
(b) 30% to 50% magnesium hydroxide ($Mg(OH)_2$);
(c) 10% to 30% of one or more magnesium carbonate; and
(d) up to 10% chloride
based on the total weight of components (a) to (d).

9. A hydraulic binder composition as claimed in claim 2, comprising MgO and/or $Mg(OH)_2$, magnesium carbonate and optionally chloride in an amount selected from one of the following ranges:
i)
(a) 70% to 95% magnesium oxide (MgO);
(b) 5% to 20% of one or more magnesium carbonate; and
(c) up to 10% chloride
based on the total weight of components (a) to (c);
ii)
(a) 30% to 80% magnesium oxide (MgO);
(b) 20% to 60% of one or more magnesium carbonate; and
(c) up to 10% chloride
based on the total weight of components (a) to (c);
iii)
(a) 10% to 40% magnesium oxide (MgO);
(b) 60% to 80% of one or more magnesium carbonate; and
(c) up to 10% chloride
based on the total weight of components (a) to (c);
iv)
(a) 40% to 85% magnesium oxide (MgO);
(b) 5% to 30% magnesium hydroxide ($Mg(OH)_2$);
(c) 10% to 20% of one or more magnesium carbonate;
(d) up to 10% chloride
based on the total weight of components (a) to (d);
v)
(a) 20% to 75% magnesium oxide (MgO);
(b) 5% to 30% magnesium hydroxide ($Mg(OH)_2$);
(c) 20% to 40% of one or more magnesium carbonate; and
(d) up to 10% chloride
based on the total weight of components (a) to (d);
vi)
(a) 10% to 60% magnesium oxide (MgO);
(b) 30% to 50% magnesium hydroxide ($Mg(OH)_2$);
(c) 10% to 30% of one or more magnesium carbonate; and
(d) up to 10% chloride
based on the total weight of components (a) to (d).

10. A hydraulic binder composition as claimed in claim 4, comprising MgO and/or $Mg(OH)_2$, magnesium carbonate and optionally chloride in an amount selected from one of the following ranges:
i)
(a) 70% to 95% magnesium oxide (MgO);
(b) 5% to 20% of one or more magnesium carbonate; and
(c) up to 10% chloride
based on the total weight of components (a) to (c);
ii)
(a) 30% to 80% magnesium oxide (MgO);
(b) 20% to 60% of one or more magnesium carbonate; and
(c) up to 10% chloride
based on the total weight of components (a) to (c);
iii)
(a) 10% to 40% magnesium oxide (MgO);
(b) 60% to 80% of one or more magnesium carbonate; and
(c) up to 10% chloride
based on the total weight of components (a) to (c);
iv)
(a) 40% to 85% magnesium oxide (MgO);
(b) 5% to 30% magnesium hydroxide ($Mg(OH)_2$);
(c) 10% to 20% of one or more magnesium carbonate;
(d) up to 10% chloride
based on the total weight of components (a) to (d);
v)
(a) 20% to 75% magnesium oxide (MgO);
(b) 5% to 30% magnesium hydroxide ($Mg(OH)_2$);
(c) 20% to 40% of one or more magnesium carbonate; and
(d) up to 10% chloride
based on the total weight of components (a) to (d);
vi)
(a) 10% to 60% magnesium oxide (MgO);
(b) 30% to 50% magnesium hydroxide ($Mg(OH)_2$);
(c) 10% to 30% of one or more magnesium carbonate; and
(d) up to 10% chloride
based on the total weight of components (a) to (d).

11. A hydraulic binder composition as claimed in claim 1, wherein the average particle diameter of the MgO/$Mg(OH)_2$ particles is about 0.01 to 800 μm; and/or
wherein the average particle diameter of the magnesium carbonate particles is approximately 0.01 to 800 μm.

12. A hydraulic binder composition as claimed in claim 1 in a composition also comprising a filler.

13. The hydraulic binder composition of claim 1 wherein the composition is used for concrete, mortar or cement.

14. A construction product comprising the hydraulic binder composition claimed in claim 1 wherein the construction product is a block, a tile, a roof tile, a brick, or mortar.

15. A method of making a construction product comprising mixing together the hydraulic binder composition of claim 1 with:
- (e) water and
- (f) optionally an additive or filler and allowing the mixture to set.

16. The method of making a construction product according to claim 15 wherein the amounts of components (e) to (f) are, in weight % based on the total weight of components (a) to (f):
- (e) 5-80%; and
- (f) up to 99.

17. A kit for forming a hydraulic binder composition in the form of a dry powder comprising
- (a) 10-95% magnesium oxide,
- (b) 5-80% magnesium carbonate of the general formula I as defined in claim 1 and
- (c) up to 10% chloride.

* * * * *